United States Patent [19]

Vakil

[11] 4,287,535
[45] Sep. 1, 1981

[54] HIGH VOLTAGE SHUTDOWN CIRCUIT WITH CURRENT FEEDBACK FOR CATHODE RAY TUBE

[75] Inventor: Bharat N. Vakil, Coral Springs, Fla.

[73] Assignee: Zenith Radio Corporation, Glenview, Ill.

[21] Appl. No.: 87,901

[22] Filed: Oct. 24, 1979

[51] Int. Cl.³ .............................................. H04N 5/68
[52] U.S. Cl. ...................................... 358/243; 358/190
[58] Field of Search ................... 358/190, 243; 328/9

[56] References Cited

U.S. PATENT DOCUMENTS 4,045,742  8/1977  Meehan et al. ................ 358/243 X Primary Examiner—Robert L. Richardson
Attorney, Agent, or Firm—Thomas E. Hill

[57] ABSTRACT

An X-radiation protection circuit in a television receiver which permits safe operation at higher voltages and beam currents with corresponding increased video presentation brightness without the production of hazardous X-radiation by means of a control loop in which current in the high voltage sweep transformer generates a feedback signal to a conventional shutdown circuit. Excessive transformer current evidencing high electron beam current automatically lowers the turn-on voltage of the shutdown circuit providing for CRT operation at maximum safe high voltage levels and electron beam currents in accordance with "Isodose" safety curves for CRT operation.

9 Claims, 2 Drawing Figures

HIGH VOLTAGE SHUTDOWN CIRCUIT WITH CURRENT FEEDBACK FOR CATHODE RAY TUBE

BACKGROUND OF THE INVENTION

This invention relates in general to X-radiation protection systems in a television receiver and in particular to an improved high voltage shutdown circuit for automatically controlling the shutdown voltage of a television receiver.

A cathode ray tube (CRT) in a typical color television receiver requires several operating potentials the highest of which is the accelerating potential of approximately 25 to 30 kilovolts. This voltage, which is generally referred to as the high voltage, is applied to an anode within the CRT to accelerate the emitted electrons to an energy level sufficient to cause light emission upon impact with the phosphor-coated faceplate of the CRT and illumination of the viewing screen. Two operating parameters, the electron accelerating potential and the electron beam current, are particularly important in establishing CRT performance levels. For example, CRT viewing screen brightness is determined primarily by electron beam current intensity. In general, optimum television receiver performance requires operating at the highest possible electron accelerating potential and electron beam current.

One of the most important limitations placed upon these operating parameters is related to safety. Energetic electrons striking the faceplate of the CRT produce X-radiation. If the television receiver is operated at an electron accelerating voltage higher than that for which it was designed, the rate of X-radiation emission may exceed a predetermined maximum safe level. Operation of the television receiver at a voltage higher than that for which it was designed may be due to any one of a variety of factors such as a transient high voltage surge, a faulty high voltage regulating component or an improper receiver voltage setting. Whatever the source, this over-voltage situation is made even more dangerous because of the difficulty in detecting it. Indeed, even with a dangerous increase in operating voltage the television receiver may continue to operate satisfactorily or even with an improvement in performance due to enhanced video presentation brightness. Increased interest in consumer protection combined with increasing television receiver operating voltages have, therefore, prompted much work in the area of further assuring safe CRT operation at acceptable operating voltage levels.

In general, the high voltage, or flyback, transformer is energized by the horizontal drive circuit. The horizontal drive circuit, in turn, is driven by a series of synchronization input pulses controlled by a pulse width modulator. The output of the horizontal drive circuit energizes the primary of the high voltage sweep transformer which in turn drives the tertiary winding of the high voltage sweep transformer. The tertiary winding provides approximately 30 kilovolts DC to the CRT's ultor, or anode, for tube turn-on. In addition, the tertiary winding provides current to the Automatic Brightness Limiter (ABL) which provides current to the CRT's cathode and various control grids. The conventional high voltage shutdown system monitors the voltage level applied to the high voltage anode and provides a shutdown signal to the horizontal drive circuit through the pulse width modulator when the anode voltage level exceeds a predetermined value. The feedback signal provided to the pulse width modulator is proportional to the absolute value of the detected high voltage level. This results in the establishment of a high voltage limit independent of electron beam current even though both of these operating parameters, in combination, establish the level of X-radiation emission.

One approach to solving the problem of X-radiation in the CRT of a television receiver is disclosed in U.S. Pat. No. 3,644,669. The system described therein utilizes a current transformer to sense the pulsating DC current in the high voltage lead of the CRT to generate a control voltage corresponding to the average beam current intensity. This control voltage operates a threshold circuit which limits the drive to the CRT when the average beam intensity exceeds a predetermined level. While providing an effective means for limiting CRT beam intensity, this approach, because it derives the feedback control signal directly from the high voltage source to the CRT, is subject to high voltage failure modes thus requiring the use of more expensive components for operating in the high voltage environment.

Another approach to solving the problem of overvoltage operation in a television receiver is disclosed in U.S. Pat. No. 4,047,078. The invention described therein, which was designed primarily to provide a high voltage shutdown circuit possessing greater immunity to erroneous triggering, involves an overvoltage detection system which senses variations in the amplitude and duration of the retrace portion of the horizontal scansion signal. Thus, this system only indirectly senses either electron accelerating potential or electron beam current intensity in correcting for an overvoltage situation which could lead to the emission of hazardous X-radiation. A more desirable approach would be to more directly sense CRT voltage in generating the approach feedback control signal.

Still another approach to providing overvoltage protection in the CRT of a television receiver is disclosed in U.S. Pat. No. 3,692,933. The overvoltage protection circuit disclosed therein samples an output of the high voltage transformer to determine the high voltage level of the television receiver. The protection circuit then generates a control signal which is coupled to an input to the automatic gain control circuit of the television receiver which, in turn, produces a signal for limiting the receiver's gain in proportion to the strength of a synchronizing signal component of a broadcast television signal selected by the tuner and applied to the automatic gain control input. The output signal of the overvoltage protection circuit to the automatic gain control circuit overrides the incoming synchronizing signal when the high voltage output rises above a predetermined level with the result that all inputs to the television receiver's CRT are terminated. Thus, this approach also represents a more indirect means for controlling the voltage applied to the CRT. Rather than applying voltage corrections directly to the CRT, this system adds to the television receiver's complexity by interfacing with the CRT through the automatic gain control circuit of the television receiver. Other, less pertinent, attempts at providing overvoltage protection in a television receiver are disclosed in U.S. Pat. Nos. 3,649,901 and 3,715,464.

Regardless of the approach taken, the prior art has not been able to adequately deal with the unique relationship between television receiver high voltage and beam current intensity in providing safe operation at optimum brightness levels. An inverse relationship exists between voltage level and beam current intensity as they relate, in combination, to the assurance that predetermined maximum levels of X-radiation emission are not exceeded. For example, as the voltage increases the beam current must decrease in order to avoid the emission of X-radiation. This relationship between high voltage and beam current intensity is generally provided by a CRT manufacturer for a particular tube in the form of an "Isodose" curve. Voltagebeam current combinations above the "Isodose" curve produce X-radiation while voltage-beam current combinations below the curve provide for safe television receiver operation. While the prior art fails to take into account the relationship between these two CRT parameters as they relate to safe television receiver operation, the present invention is designed to permit television receiver operation at higher electron accelerating potentials and increased beam current intensities while maintaining safe operation at optimum brightness levels.

OBJECTS OF THE INVENTION

Accordingly, it is an object of the present invention to provide an improved high voltage shutdown circuit.

It is another object of the present invention to provide a system for safely operating a television receiver without the emission of hazardous X-radiation.

It is still another object of the present invention to provide an improved control circuit for a television receiver in which high voltage transformer current is monitored in generating a high voltage shutdown control signal.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1:
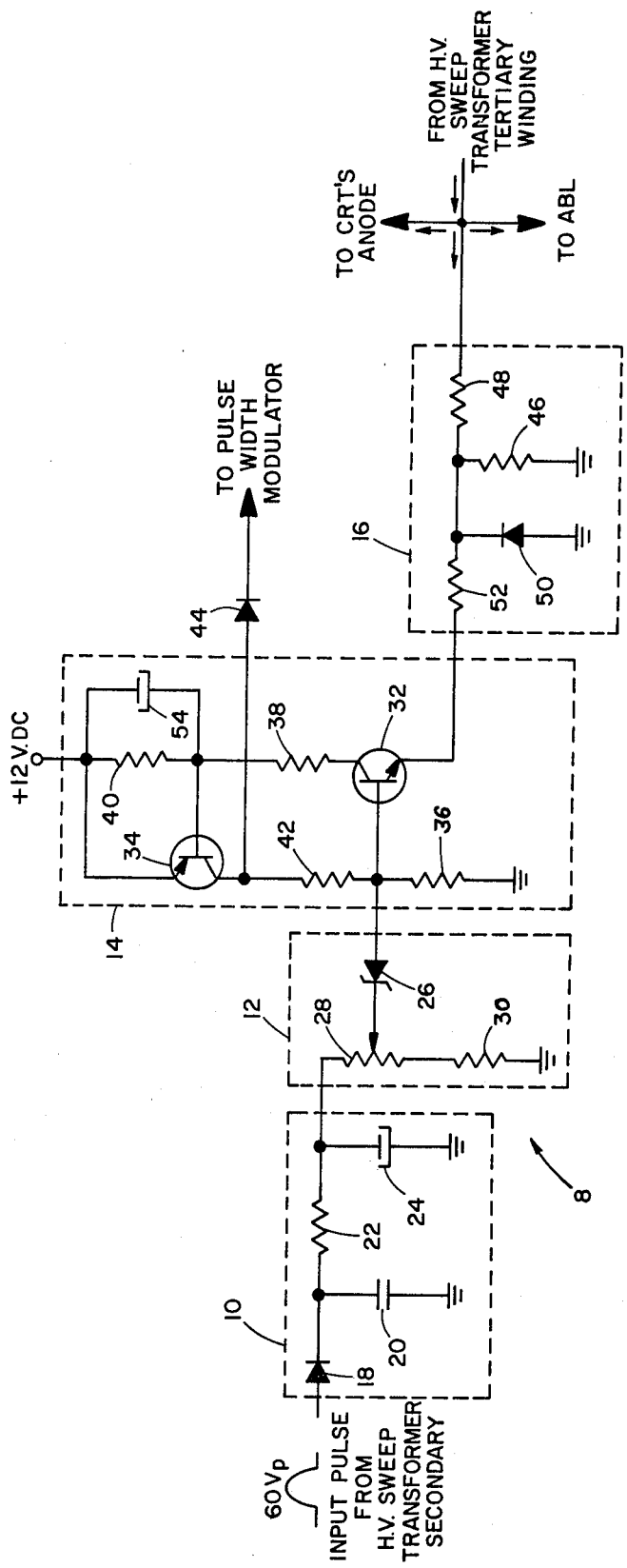
FIG. 1 is a circuit diagram showing a current-sensing, overvoltage shutdown circuit for X-radiation protection in a CRT in accordance with the preferred embodiment of the present invention.

Referring to the circuit diagram of FIG. 1, there is shown a current-sensing overvoltage shutdown circuit 8 for X-radiation protection in a CRT in accordance with the preferred embodiment of the present invention. The primary components of this system are in input rectification and filter network 10, an input voltage threshold detector 12, a coupled transistor output stage 14 and a voltage biasing feedback loop 16.

An input pulse is provided to the high voltage shutdown circuit 8 by the high voltage sweep transformer secondary winding (not shown). This input pulse has a nominal value of 60 volts DC, but its amplitude is proportional to the voltage across the high voltage transformer's primary and tertiary windings. Thus, if the output of the high voltage transformer on the tertiary winding of the CRT's anode increases, the 60 volt input pulse will increase proportionally. The input pulse is rectified by diode 18 and unwanted signal components are filtered out by means of capacitor 20, resistor 22 and filter capacitor 24. The input rectification and filter network 10 produces a smooth DC-level without the presence of voltage peaks which can cause unwanted false alarms in the high voltage shutdown circuit. Diode 18 also acts as a peak detector to produce a DC-level. As a result of this peak detection and filtering action, the nominal 60 volt input pulse is converted to approximately a 40 volt DC level at the output of filter network 10.

This DC voltage level is then passed through a threshold detector 12 consisting of a potential divider in combination with Zener diode 26. The potential divider network is comprised of potentiometer 28 and resistor 30. While in the preferred embodiment of the present invention potentiometer 28 is set at a constant resistance, the present invention would work equally well with a variable resistance established by various potentiometer settings. By means of potentiometer 28 and resistor 30 the 40 volt DC level is divided down to approximately 10 volts DC for normal operation. This 10 volt level is provided to Zener diode 26 which possesses a reverse voltage breakdown value of 12 volts DC. Thus, under normal operation with a 60 volt input pulse provided to shutdown circuit 8, Zener diode 26 is nonconducting. Because the 60 volt input pulse is proportional to the electron accelerating potential applied to the CRT's anode by the high voltage sweep transformer (not shown), the rectified DC voltage and the divided-down voltage are also proportional to the voltage across the tertiary winding of the high voltage sweep transformer. If the sweep transformer's voltage changes, all of these voltages change proportionally. In this manner, threshold detector 12 is directly responsive to the voltage across the high voltage sweep transformer. If this voltage exceeds a predetermined value such that the DC level provided to Zener diode 26 exceeds 12 volts, Zener diode 26 breaks down and conducts in the reverse direction providing current proportional to the sweep transformer's voltage to the coupled transistor output stage 14. For use in a television receiver designed to operate at 30 kilovolts, component operating parameters in the present invention are selected to permit Zener diode breakdown when sweep transformer voltage exceeds 33 kilovolts.

When the input pulse voltage exceeds a predetermined value resulting in current condition by the threshold detector 12, a voltage is applied to the coupled transistor stage 14. This output stage is comprised primarily of coupled transistors 32 and 34 with the input voltage applied to the base of transistor 32. With no current transmitted by threshold detector 12, transistors 32 and 34 are turned off with no output provided by shutdown circuit 8. With Zener diode 26 conducting in the reverse direction, when the voltage across resistor 36 reaches 0.7 volts transistor 32 is turned on. With transistor 32 conducting, its collector draws current through resistors 38 and 40 from a 12 volt DC supply. This results in a lowering of the voltage applied to the base of transitor 34 and causes transistor turn on when the base-emitter voltage of transistor 34 reaches 0.7 volts. With transistor 34 turned on, current is transmitted from the 12 volt DC supply through resistors 42 and 36 to ground. This, in turn, increases the base-emitter voltage across transistor 32 turning transistor 32 on even harder forcing it into saturation. With increased collector current on transistor 32, the voltage bias across transistor 34 increases forcing the collector current of transistor 34 to increase thus producing a coupled-transistor loop, or feedback, effect. Transistors 32 and 34, operating in a saturated conducting state, become latched such that they will continue to conduct even if Zener diode 26 ceases to pass current. The coupled transistor output stage 14 can be turned off only by either disconnecting the 12 volt DC power supply or by turning the television receiver off.

Eventually Zener diode 26 shuts off, but the coupled transistors remain latched in a closed, current-conducting loop energized by the 12 volt DC power supply. The coupled transistor circuit thus acts as a silicon-controlled rectifier (SCR). With transistors 32 and 34 locked and latched, the voltage at the collector of transistor 34 increases to approximately 11 volts. This produces approximately 11 volts DC at the anode of diode 44 causing diode 44 to become forward biased and to pass current resulting in a +11 volts DC being applied to the pulse width modulator input to the horizontal drive circuit (not shown). The horizontal drive circuit, which is driven by horizontal synchronization, or drive, input pulses, energizes the primary winding of the high voltage sweep transformer. A DC level produced by the coupled transistor output stage 14 and transmitted by diode 44 turns the horizontal drive circuit off thus removing power from the high voltage sweep transformer. It is in this manner, as described in the preceeding paragraphs, that the conventional high voltage shutdown circuit turns the CRT off due to overvoltage operation.

In accordance with the present invention, voltage biasing feedback loop 16 provides a control input to coupled transistor output stage 14. The tertiary winding of the high voltage sweep transformer provides current to the voltage biasing feedback network 16 which is proportional to the electron accelerating potential applied to the anode of the CRT. As increased current is provided to the CRT's anode to obtain a brighter picture, increased current is transmitted to the voltage biasing feedback network 16. This increase in current produces an increased voltage across resistors 46 and 48 which are coupled in series to ground. Resistors 46 and 48, in combination, form a voltage divider network which provides a reduced voltage to the emitter of transistor 32. As current provided to the CRT increases, the current in the voltage biasing feedback network 16 proportionally increases with the voltage across resistor 46 becoming more negative. This, in turn, drives the emitter of transistor 32 more negative. With a total emitter-base voltage of 0.7 volts required for transistor turn on, as the emitter of transistor 32 becomes more negative the position voltage applied to its base required for turn-on also decreases. By lowering the threshold turn-on voltage of the coupled transistor output stage 14, the high voltage shutdown circuit 8 limits the high voltage applied to the CRT as a function of the electron beam current intensity. Thus, as increased voltage is applied to the CRT's anode through the high voltage transformer's tertiary winding, more current is fed back through the voltage biasing feedback loop 16 from the pulse winding of the high voltage transformer to the collector of transistor 32. This lowers the turn-on voltage of coupled transistor output stage 14 permitting a decrease in the turn-on voltage of the high voltage shutdown circuit for increasing electron beam current intensities as evidenced by increasing current fed back through the voltage biasing feedback loop 16.

Figure 2:
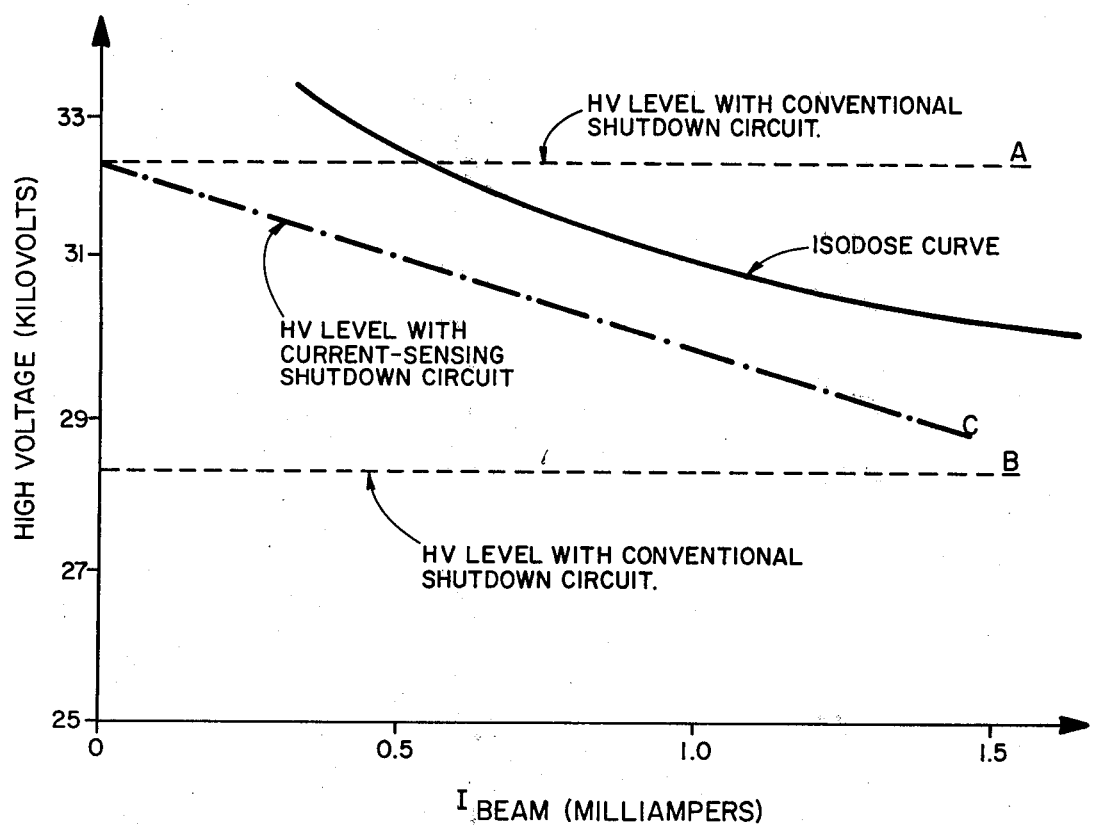
FIG. 2 shows graphically the relationship between electron accelerating voltage level and electron beam current intensity as they relate to X-radiation emission in a television receiver.

The performance of the present invention incorporated in a typical television receiver is shown graphically in FIG. 2. The upper and lower curves, A and B, represent turn-off in a conventional high voltage shutdown circuit. As can be seen, the voltage remains essentially constant as beam current is varied in a conventional high voltage shutdown circuit. Also shown in FIG. 2 is an "Isodose" curve representing a safe combination of high voltage and beam current so as not to produce hazardous X-radiation. The maximum safe X-radiation level recognized by the television industry and federal government is 5 millirem/hour, which is represented by the "Isodose" curve for a given CRT. The area above the "Isodose" curve represents excessive X-radiation levels while the area below the curve is within generally acceptable safety limits. If the television receiver is operated at a voltage level represented by curve A, it can readily be seen that excessive X-radiation will be emitted by the television receiver. While curve B represents a safe operating voltage level, the video presentation will correspondingly be diminished due to the relatively low voltage applied to the CRT. Ideally, the high voltage-electron beam current curve should approach the "Isodose" curve as closely as possible. This is made possible by the present invention as represented by curve C in FIG. 2. By making the high voltage shutdown point not merely a constant, pre-determined threshold voltage level above which the receiver is turned off but rather a real-time, ever-changing function of electron beam current intensity, the present invention permits the television receiver's shutdown characteristic to closely approach the "Isodose" curve. This increases operating voltage level and beam current in an optimum combination to provide safe receiver operation with exponentially increased CRT video presentation brightness.

In addition to providing an input signal to the voltage biasing feedback network 16, the tertiary winding of the high voltage sweep transformer provides a signal to the Automatic Brightness Limiter (ABL) which automatically limits the maximum electron beam current. Diode 50 limits the amount of negative voltage applied to the emitter of transistor 32 while providing protection against false triggering of the voltage biasing feedback loop 16. Resistor 52 is a current limiting resistor which limits current through the feedback loop to the emitter of transistor 32. By thus limiting the low end of high voltage shutdown circuit turn-on, the shutdown circuit operates within a voltage window permitting normal television receiver operation therein. The values of resistors 46 and 48 are selected to provide the correct voltage to the emitter of transistor 32 from the tertiary winding of the high voltage sweep transformer. Filter capacitor 54 also provides protection against false triggering of the shutdown circuit by eliminating voltage peaks in the coupled transistor output stage 14.

By way of illustrative example and not by way of limitation, the following components of the preferred embodiment of the present invention may have the following values:

| REFERENCE NO. | PREFERRED VALUE |
| --- | --- |
| 20 | 0.1 farads |
| 22 | 12 kilohms |
| 24 | 2.2 microfarads |

-continued

| REFERENCE NO. | PREFERRED VALUE |
|---|---|
| 30 | 4.7 kilohms |
| 36 | 47 kilohms |
| 38 | 6.2 kilohms |
| 40 | 4.7 kilohms |
| 42 | 22 kilohms |
| 46 | 270 ohms |
| 48 | 56 ohms |
| 52 | 22 ohms |
| 54 | 2.2 microfarads |

There has thus been provided a high voltage shutdown circuit which permits safe operation of a television receiver at maximum permissable voltage and beam current levels. Current through the tertiary winding of high voltage sweep transformer provides a feedback signal to the shutdown circuit which permits a lowering of shutdown circuit turn-on voltage for increasing electron beam current intensity. This allows television receiver operation at optimum brightness levels while avoiding the need to automatically turn the television receiver off when a predetermined unsafe voltage level is exceeded.

In addition, while particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a television receiver having a cathode ray tube display device in which is produced an electron beam current and including an output transformer, said output transformer including a primary winding energized by a high voltage generation network responsive to periodically recurring input voltage pulses from a pulse width modulator, a tertiary winding energized by said primary winding coupled to an ultor of said cathode ray tube for applying a first high voltage to said ultor for initiating electron beam current in said cathode ray tube and coupled to a control grid of said cathode ray tube for applying a second lower voltage to said control grid for regulating electron beam current intensity, and an output pulse secondary winding energized by said primary winding for generating output pulses proportional in magnitude to the high voltage applied to said ultor, a high voltage shutdown circuit comprising:

DC voltage level conversion means for receiving pulses from said output pulse secondary winding and for converting said output pulses to a DC voltage level, said DC voltage level being proportional to the ultor voltage;

DC voltage level threshold detecting means coupled to said DC voltage level conversion means for producing an output proportional in magnitude to said DC voltage level when said DC voltage level corresponding to a predetermined ultor voltage exceeds a predetermined value, with no output produced when said predetermined DC voltage level is not exceeded;

transistor conducting means for coupling said DC voltage level threshold detecting means to said pulse width modulator such that the output of said pulse width modulator to said high voltage generation network is a DC level signal when said predetermined ultor voltage is exceeded, said DC level signal rendering the high voltage generation network inoperative thereby turning off said output transformer and said cathode ray tube; and voltage biasing means coupling the second lower voltage output of said tertiary winding to said transistor conducting means for varying said predetermined ultor voltage required for turning on said high voltage shutdown circuit as a function of output transformer tertiary winding current, thus permitting safe cathode ray tube operation at optimum voltage level and electron beam current intensity combinations.

2. A system according to claim 1 wherein the tertiary winding of said output transformer and said voltage biasing means are coupled such that increasing current in said tertiary winding produces a more negative DC voltage level across said voltage biasing means thereby biasing the turn on voltage level of said transistor conducting means in a negative direction.

3. A system according to claim 2 wherein said voltage biasing means includes means for limiting the negative voltage generated across said voltage biasing means and transmitted to said transistor conducting means.

4. A system according to claim 1 wherein said transistor conducting means comprises two coupled transistors connected to a DC power supply, said coupled transistors rendered conducting in a saturated state when an input signal is received from said DC voltage level threshold detecting means with said coupled transistors continuing to conduct following removal of said input signal.

5. A system according to claim 4 wherein the input signal from said DC voltage level threshold detecting means is applied to the base of one of said coupled transistors.

6. A system according to claim 1 wherein said voltage biasing means comprises:
a voltage divider network, the voltage across said voltage divider network decreasing as the current of said tertiary winding of the output transformer increases;
resistor means coupling said voltage divider network to said transistor conducting means; and
diode conducting means coupling the series combination of said voltage divider network and said resistor means to neutral ground potential thus limiting the bias voltage applied to said transistor conducting means.

7. A system according to claim 6 wherein said transistor conducting means comprises a first transistor and a second transistor connected to a DC power supply, said first and second transistors coupled such that the output of said DC voltage level detecting means to the base of said first transistor causes said first and second transistors to operate in a saturated conducting state.

8. A system according to claim 7 wherein said voltage biasing means is coupled to the emitter of said first transistor thus lowering the base to emitter voltage of said first transistor when current passes through said tertiary winding permitting shutdown circuit turn-on at increased ultor voltages with increased electron beam current intensities.

9. In a television receiver having a cathode ray tube display device in which is produced an electron beam current and including an output transformer, said output transformer including a primary winding energized by a high voltage generation network responsive to periodically recurring input voltage pulses from a pulse width modulator, a tertiary winding energized by said primary winding coupled to an ultor of said cathode ray tube for applying a first high voltage to said ultor for initiating electron beam current in said cathode ray tube and coupled to a control grid of said cathode ray tube for applying a second lower voltage to said control grid for regulating electron beam current intensity, and an output pulse secondary winding energized by said primary winding for generating output pulses proportional in magnitude to the voltage applied to said ultor, an X-radiation protection system comprising:

- DC voltage level conversion means for receiving pulses from said output pulse secondary winding and for converting said output pulses to a DC voltage level, said DC voltage level being proportional to the voltage applied to said ultor;
- DC voltage level threshold detecting means coupled to said DC voltage level conversion means for producing an output proportional in magnitude to said DC voltage level when said DC voltage level corresponding to a predetermined voltage applied to said ultor exceeds a predetermined value, with no output produced when said predetermined DC voltage level is not exceeded;
- coupled transistors connected to a DC power supply for coupling said DC voltage level threshold detecting means to said pulse width modulator such that the output of said pulse width modulator to said high voltage generation network is a DC level signal when said predetermined ultor voltage is exceeded thereby turning off said output transformer and said cathode ray tube, said coupled transistors rendered conducting by the output signal of said DC voltage level threshold detecting means with said coupled transistors continuing to conduct following termination of said output signal; and voltage biasing means including:
- a voltage divider network, the voltage across said voltage divider network decreasing as the current of said tertiary winding of the output transformer increases;
- resistor means coupling said voltage divider network to the emitter of one of said coupled transistors; and
- diode conducting means coupling the series combination of said voltage divider network and said resistor means to neutral ground potential;
- said voltage biasing means coupling the second lower voltage output of said tertiary winding to said transistor conducting means for varying said predetermined ultor voltage required for turning on said high voltage shutdown circuit as a function of output transformer tertiary winding current, thus permitting safe cathode ray tube operation at optimum voltage level and electron beam current intensity combinations.

* * * * *